July 18, 1950  G. C. POLK  2,515,894
DUST COLLECTOR
Filed Sept. 16, 1947  3 Sheets-Sheet 1

INVENTOR.
Gilbert C. Polk
BY Andrew K. Foulds
his ATTORNEY

July 18, 1950 G. C. POLK 2,515,894
DUST COLLECTOR
Filed Sept. 16, 1947 3 Sheets-Sheet 2

INVENTOR.
Gilbert C. Polk
BY
Andrew K. Foulds
his ATTORNEY

July 18, 1950
G. C. POLK
2,515,894
DUST COLLECTOR
Filed Sept. 16, 1947
3 Sheets-Sheet 3
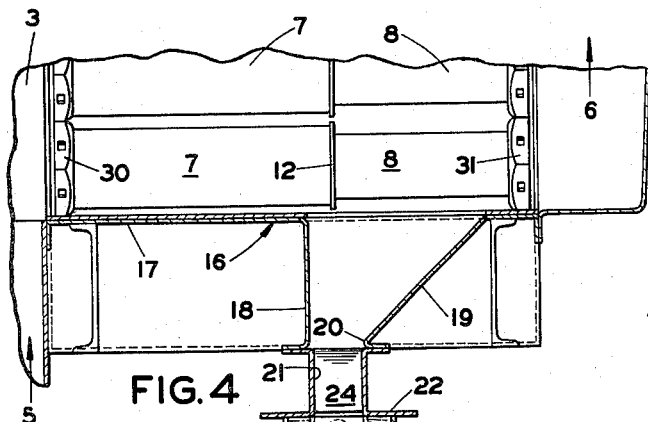
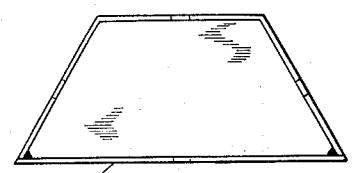
FIG. 10
FIG. 11
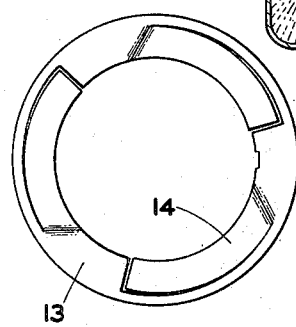
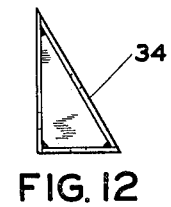
FIG. 12
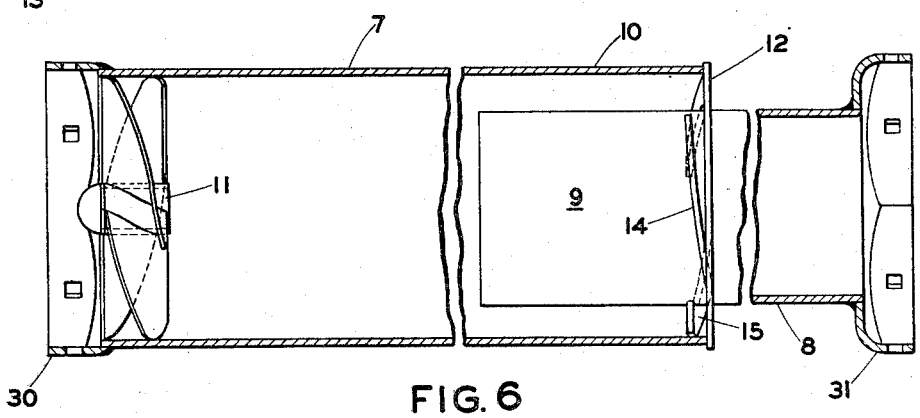
INVENTOR.
Gilbert C. Polk
BY
Andrew K. Foulds
his ATTORNEY Patented July 18, 1950

2,515,894

UNITED STATES PATENT OFFICE 2,515,894

DUST COLLECTOR

Gilbert C. Polk, Detroit, Mich., assignor to American Blower Corporation, Dearborn, Mich., a corporation of Delaware Application September 16, 1947, Serial No. 774,264

11 Claims. (Cl. 183—80)

This invention relates to new and useful improvements in centrifugal separators in general and more specifically to dust or cinder collectors.

One of the objects of this invention is to provide a new and improved dust collector.

Another object is to provide a dust collector having a plurality of collector conduits and having a means to effect a substantially equal collector of dust or other particles in each of said conduits.

Another object is to provide a dust collector which is operable to separate a gas stream into a clean portion and a particle laden portion and having an improved means for withdrawing the particle laden gas stream portion.

Another object is to provide a dust collector having a plurality of collector conduits of improved construction for ease of assembly.

Figures 1, 5:
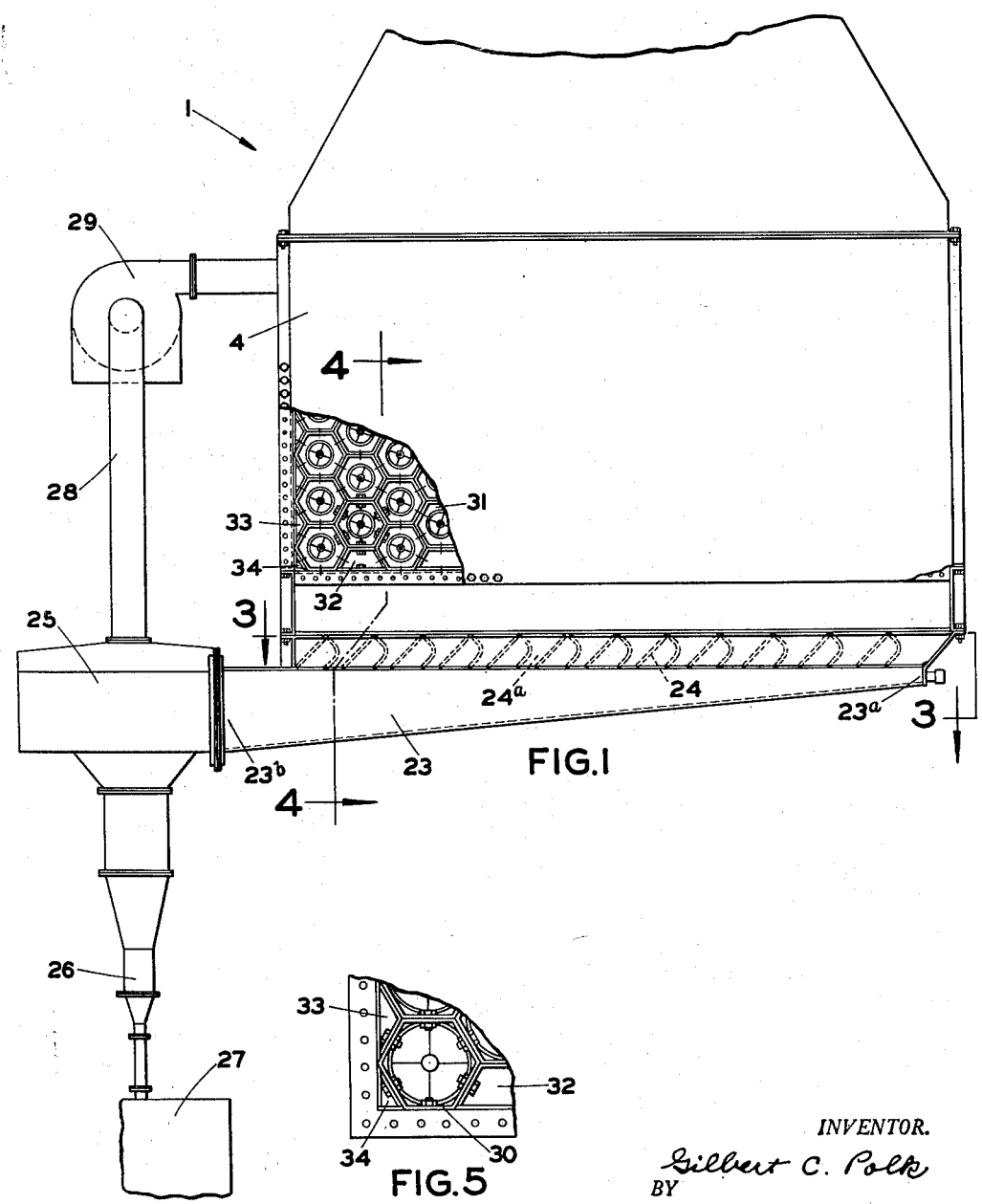
Figure 2:
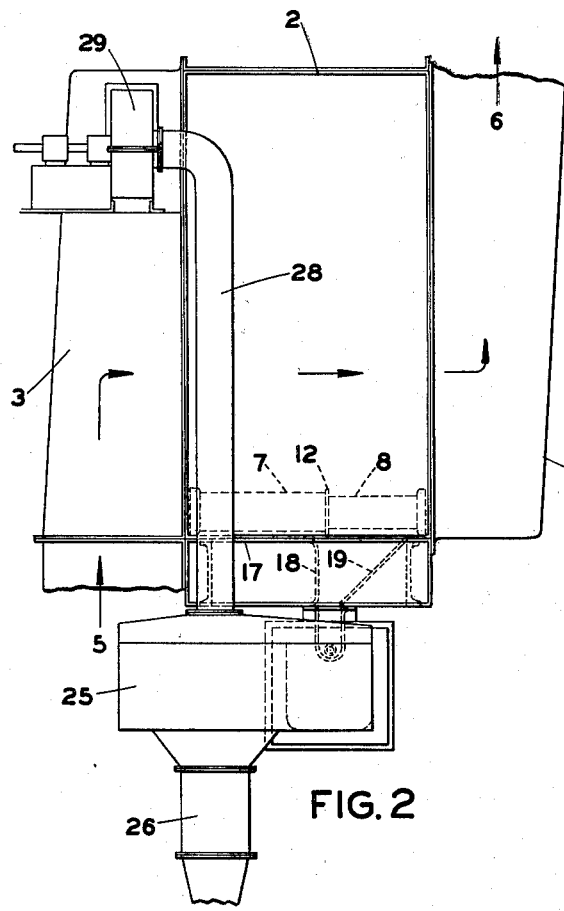
Figure 8:
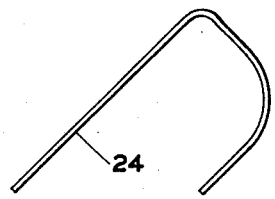
Figure 9:
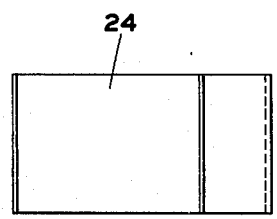
Figure 3:
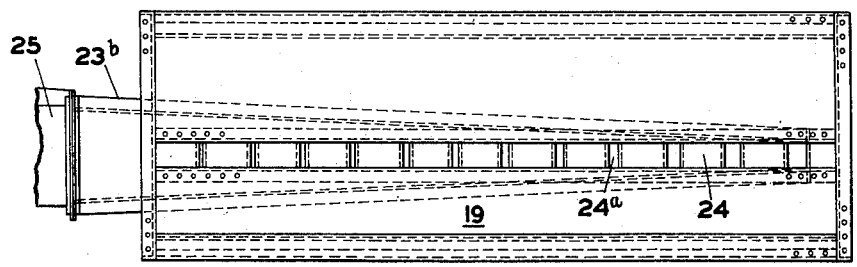

In the accompanying drawings, to be taken as a part of this specification, there is clearly and fully illustrated a preferred embodiment of this invention, in which drawings:

Figure 1 is a view in front elevation of a dust collector embodying this invention and having a portion of the collector casing broken away to show the assembly of the collector conduits, Fig. 2 is a view in side elevation of Fig. 1 on a slightly enlarged scale, Fig. 3 is a plan view taken on the section line 3—3 of Fig. 1, Fig. 4 is a sectional view taken on the section line 4—4 of Fig. 1 but showing the collector conduits in full elevation, Fig. 5 is an enlarged end view of the inlet end of one of the collector conduits similar to that shown in the broken away portion of Fig. 1 and showing the method of assembly, Fig. 6 is an enlarged longitudinal sectional view of one of the collector conduits, Fig. 7 is a detail plan view of an outlet guide and supporting member shown in Fig. 6, Figs. 8 and 9 are detail views in front elevation and bottom plan respectively of one of the outlet distributor members shown in Figs. 1 and 3, and Figs. 10, 11 and 12 are detail plan views of "filler" members shown in Fig. 1 which fill in the space between the hexagonal heads of the collector conduits and the walls of the collector casing.

Referring to the drawings by characters of reference, there is a dust collector unit 1 which is operable to separate from air or other gases dust or other foreign particles, liquid or solid. The dust collector 1 is operable to separate and collect a wide range of foreign particles but is especially adapted for collecting soot and "fly ash" from the stack or flue gases of a coal burning furnace and the unit would probably be mounted between the furnace flue and an induced draft fan discharging to the stack or chimney.

The collector unit 1 comprises a collector casing 2 having an inlet header casing 3 and an outlet header casing 4. The direction of flow of the particle laden gases into and out of the collector unit 1 is shown by the directional arrows 5 and 6. Extending from the inlet header side into the space enclosed by the collector casing 2 are a plurality of conduits 7 which are fastened together and supported at their inlet ends by the collector casing 2. A second plurality of conduits 8 extend into the space enclosed by the collector casing 2 from the outlet header side and are similarly fastened together and supported at their outlet ends by the collector casing 2. The inlet end portions 9 of the conduits 8 (see Fig. 6) extend into the outlet end portions 10 of the conduits 7 and the conduits 8 are positioned substantially concentrically with the conduits 7. Positioned in the inlet end of each of the conduits 7 is a helical spinner member 11 which is operable to give a rotary motion to the particle laden gas stream passing therethrough. The rotary motion given the gas stream passing through one of the spinner members 11 is operable to throw the foreign particles toward the walls of the conduit 7 and divide the gas stream into a clean central portion and a particle laden outer portion. The clean central portion of the gas stream passes out through the conduit 8 and the particle laden outer portion is discharged through the annular space between the conduit end portions 9 and 10. This separatory action is duplicated in each set of conduits 7 and 8 and a quantitative separation thereby obtained. At the outlet end of each of the conduits 7 is an annular cover member 12, shown in Figs. 6 and 7, which is operable to control the discharge of the particle laden outer portions of the plurality of gas stream portions and is further operable as a supporting member for the conduit end portions 9 and 10. The cover member 12 comprises an annular disc portion 13 having a plurality of curved portions 14 which are bent into a helical curve. In assembly, the cover member 12 is fitted around the conduit 8 to restrict the outlet from the end of the conduit 7. The helically bent portions 14 are formed to tightly fit into the annular space between the conduit end portions 9 and 10 forming annular discharge apertures 15 and providing a rigid support for the conduit end portions 9 and 10.

The collector casing 2 has a bottom wall 16 comprising a horizontal portion 17, a vertical portion 18, and a slanting portion 19. The slanting wall portion 19 extends inward from the outlet header side and together with the vertical wall portion 18 forms an elongated rectangular aperture 20 running transversely to the conduits 7 and 8 and located directly below the helical outlet apertures 15 of the cover members 12 on the conduits 7. The aperture 20 opens into a rectangular throat portion 21 of a cover member 22 to a tapered trough-shaped conduit 23. The particle laden gas stream outer portions discharge through the helical outlet apertures 15 into the space enclosed by the collector casing 2 and are conducted downward by the wall portions 18 and 19 through the aperture 20 and throat portion 21 into the trough-shaped conduit 23. The conduit 23 is closed at one end portion 23a and has an enlarged end portion 23b forming an aperture. The conduit 23 has a sloping bottom wall and increases in cross sectional area towards the enlarged end portion 23b.

In the throat portion 21 are located a plurality of bent distributor members 24 preferably formed of sheet metal, see Figs. 8 and 9 for detail view. The distributor members 24 are positioned at varying predetermined positions (see Fig. 1) along the throat portion 21, the distance between them increasing toward the small tapered end of the trough-shaped conduit 23. The increasing distances between the members 24 function to equalize the pressure drop across the annular members 12 so that substantially equal amounts of dust laden gas are drawn through the orifices 15 and substantially equal amounts of particles are caused to be separated by each of the conduits 7. The members 24 are positioned as to form a sloping nozzle or duct portion 24a opening into the conduit 23 pointing toward the enlarged end portion 23b. The increasing size of flow area of the nozzles 24a toward the closed end of the trough-shaped conduit 23 and the uniformly increasing cross section of the conduit 23 toward its outlet end cooperate to provide a uniform carrying velocity which moves the dust particles and keeps the conduit 23 cleared of the dust or foreign particles.

The trough-shaped conduit 23 carrying the separated dust laden gas stream portions opens into a cyclone type centrifugal separator 25 wherein the particles are separated from the secondary gas stream portion and removed through a conduit 26 at the bottom of the separator and collected in a container 27. The cleaned gas from the separator 25 is drawn upward through a conduit 28 by a blower 29 and discharged into the inlet header casing 3.

The inlet heads 30 of the conduits 7 and outlet heads 31 of the conduits 8 are formed in the shape of a regular hexagon for ease of assembly. The hexagonal heads 30 and 31 are easily nested together for a rigid assembly. The heads 30 and 31 are bolted together and to the casing 2 as shown in Fig. 5. The nesting together of the hexagonal heads 30 and 31 serves the further purpose of preventing any of the gas from bypassing the conduits 7 or 8. The nested hexagonal heads 30 and 31 are operable to function as a wall member with the conduits extending therethrough. It would be possible to eliminate the heads 30 and 31 and have a solid wall with apertures for admitting the conduits but the assembly would be more difficult and less economical for commercial construction.

Along the edges of the casing 2 where the heads 30 or 31 are bolted are positioned a plurality of filler members 32, 33 and 34 (see Figs. 10, 11 and 12) which fill in the spaces between the hexagonal heads 30 or 31 and the edges of the casing 2, see the broken away portion of Fig. 1.

The operation of this collector has been described in the process of setting forth the structure but will be restated for clarity:

Dust or other particle laden gases are conducted to the inlet header casing 3 where the gases are split into a plurality of gas stream portions and enter the conduits 7. As the gases enter the conduits 7 they pass through the spinner members 11 and are given a high rotary motion thereby. The high rotary motion of the gases in the conduits 7 is operable to throw the particles towards the walls of the conduits and to divide the gases into a clean central portion and a particle laden outer portion. The clean central portions pass through the conduits 8 into the outlet header 4 and are discharged therefrom as indicated by the directional arrow 6. The gas stream particle laden outer portions are discharged through the helical apertures 15 into the space enclosed by the collector casing 2. The particle laden gas stream portions are then conducted downward through the aperture 20 and throat portion 21 to the trough-shaped conduit 23 which leads to the "cyclone" collector 25. If there were no obstruction or distributor members in the throat portion 21 there would be a greater pressure drop through outlet members 12 of the conduits 7 adjacent the outlet end of the trough-shaped conduit 23, and an unequal and inefficient separation would be had through the other conduits. The distributor members 24 are operable to eliminate this undesirable feature by equalizing the pressure drop across the various conduit outlet members 12. The members 24 are closest together at the end of the throat portion 21 adjacent the outlet end of the trough-shaped conduit 23 where the pressure drop across the conduits 7 would normally be the highest and gradually increase in spacing toward the small tapered end of the conduit 23. This variable and increasing spacing between the members 24 is operable to cause equal amounts of particle laden gases to be drawn therebetween thereby to equalize the amounts of particle laden gases passing through the conduits 7 and the pressure drops thereacross. The particle laden gas stream portions discharging from the trough-shaped conduit 23 into the cyclone type separator 25 are further separated therein and the particles collected in a container 27. The gases from the separator 25 are drawn upward through a conduit 28 by a blower 29 which discharges them into the inlet header casing 3 to be recirculated with the incoming particle laden gases.

What is claimed and is desired to be secured by Letters Patent of the United States is:

1. A dust collector comprising a plurality of conduits each operable to receive a gas stream laden with foreign particles, means for imparting a rotary motion to each of said particle laden gas streams thereby to throw said foreign particles toward the walls of said conduits and to divide said gas streams into clean central portions and particle laden outer portions, a second plurality of conduits of smaller size positioned substantially concentrically in the outlet ends of said first-named conduits and operable to receive said gas stream central portions, said gas stream particle laden outer portions discharging through the annular spaces between said first-named and said second conduits, means enclosing a space around said second conduits, and means to effect a withdrawal of said discharging particle laden gas stream portions from said last-named space so that the pressure drop through each of said annular spaces will be substantially equal said last-named means comprising a plurality of discharge apertures each opening into said space and successively increasing in flow area across said collector transversely to said conduits.

2. A dust collector comprising a plurality of conduits each operable to receive a gas stream laden with foreign particles, means for imparting a rotary motion to each of said particle laden gas streams thereby to throw said foreign particles toward the walls of said conduits and to divide said gas streams into clean central portions and particle laden outer portions, a second plurality of conduits of smaller size positioned substantially concentrically in the outlet ends of said first-named conduits and operable to receive said gas stream central portions, said gas stream particle laden outer portions discharging through the annular spaces between said first-named and said second conduits, means enclosing a space around said second conduits, means to conduct said particle laden gas stream portions from said last-named space and away from the outlet ends of said first-named conduits, and means to distribute uniformly the entrance of said particle laden gas stream portions into said conducting means so that a substantially equal collection of particles may be had from each of said first-named conduits, said last-named means comprising a plurality of discharge apertures each opening from said space into said conducting means and successively increasing in flow along said conducting means.

3. A dust collector comprising a casing, a plurality of conduits extending into said casing and each operable to receive a gas stream laden with foreign particles, means for imparting a rotary motion to each of said particle laden gas streams thereby to throw said foreign particles toward the walls of said conduits and to divide said gas streams into clean central portions and particle laden outer portions, a second plurality of conduits of smaller size positioned substantially concentrically in the outlet ends of said first-named conduits and operable to receive said gas stream central portions, said casing enclosing the space around said first-named and said second conduits, said gas stream outer portions discharging through the annular space between said first-named and said second conduits into the space enclosed by said casing, said casing having a bottom wall with an opening therethrough extending transversely to said conduits, a trough-shaped conduit member covering said opening and operable to conduct away said gas stream outer portions, and dividing members spaced at predetermined and successively increasing intervals along said opening and operable to control the distribution of said gas stream outer portions entering said trough-shaped conduit thereby to effect a substantially equal collection of particles from each of said first-named conduits.

4. A dust collector comprising a conduit for receiving a gas stream laden with foreign particles, means for imparting a rotary motion to said gas stream thereby to throw said foreign particles toward the walls of said conduit and to divide said gas stream into a clean central portion and a particle laden outer portion, a second conduit of smaller size positioned substantially concentrically in the outlet end of said first-named conduit and operable to receive said gas stream central portion, said first-named conduit being supported at its inlet end and said second conduit being supported at its outlet end, and an annular disc member closing the outlet end of said first-named conduit, said disc member having a plurality of projecting portions and apertures therethrough, said disc member portions being tightly fitted in the annular space between said first-named and said second conduits, said apertures providing for the discharge of said gas stream outer portion, and said disc member portions engaging the walls of the outlet end portion of said first-named conduit and inlet end portion of said second conduit to provide a rigid supporting means therefor and to hold said disc member in position.

5. A dust collector comprising a casing, a plurality of conduits extending into said casing and each operable to receive a gas stream laden with foreign particles, means for imparting a rotary motion to each of said particle laden gas streams thereby to throw said foreign particles toward the walls of said conduits and to divide said gas streams into clean central portions and particle laden outer portions, a second plurality of conduits of smaller size positioned substantially concentrically in the outlet ends of said first-named conduits and operable to receive said gas stream central portions, said first-named conduits being supported by said casing at their inlet ends and said second conduits being supported by said casing at their outlet ends, a plurality of annular disc members closing the outlet end of each of said first-named conduits, said disc members each having a plurality of supporting portions and openings, said disc member supporting portions being tightly fitted in the annular space between said first-named and said second conduits and engaging the respective walls thereof, said openings forming a plurality of apertures for the discharge of said gas stream outer portion, said supporting portions rigidly supporting the outlet ends of said first-named conduits and inlet ends of said second-named conduits and holding said disc members rigidly in position, said gas stream outer portions discharging through said apertures into the space enclosed by said casing, said casing having a bottom wall with an opening therethrough, a trough-shaped conduit member covering said opening and operable to conduct away said gas stream outer portions, and dividing members spaced at predetermined intervals along said opening and operable to control the distribution of said gas stream outer portions entering said trough-shaped conduit thereby to effect a substantially equal collection of particles from each of said first-named conduits and a substantially equal pressure drop across each of said apertures.

6. A dust collector comprising a casing, a plurality of conduits extending into said casing and each operable to receive a gas stream laden with foreign particles, means for imparting a rotary motion to each of said particle laden gas streams thereby to throw said foreign particles toward the walls of said conduits and to divide said gas streams into clean central portions and particle laden outer portions, a second plurality of conduits of smaller size positioned substantially concentrically in the outlet ends of said first-named conduits and operable to receive said gas stream central portions, the inlet ends of said first-named conduits and the outlet ends of said second conduits having hexagonally shaped head portions which are operable to be nested together in a tightly fitting position thereby preventing bypassing of gas around said conduits, said hexagonal head portions being supported by said casing, a plurality of annular disc members closing the outlet end of each of said first-named conduits, said disc members each having a plurality of cut portions bent in the form of a helix, said disc member helical portions being tightly fitted in the annular space between said first-named and said second conduits and forming a plurality of helical apertures for the discharge of said gas stream outer portion, said disc members and helical portions thereof forming rigid supporting members for the outlet ends of said first-named conduits and inlet ends of said second-named conduits, said gas stream outer portions discharging through said helical apertures into the space enclosed by said casing, said casing having a bottom wall with an opening therethrough, a trough-shaped conduit member covering said opening and operable to conduct away said gas stream outer portions, and inverted curved dividing members spaced at predetermined intervals along said opening and operable to control the distribution of said gas stream outer portions entering said trough-shaped conduit thereby to effect a substantially equal collection of particles from each of said first-named conduits and a substantially equal pressure drop arcoss each of said disc members.

7. A dust collector comprising a casing, a plurality of conduits extending into said casing and each operable to receive a gas stream laden with foreign particles, means to cause said gas streams to rotate thereby to throw said particles toward the walls of said conduits and divide said gas streams into clean central portions and particle laden outer portions, a second plurality of conduits positioned substantially concentrically in the outlet end portions of said first-named conuits and operable to receive said gas stream central portions, the inlet ends of said first-named conduits and the outlet ends of said second conduits having head portions of hexagonal shape operable to be nested tightly together to prevent bypassing of said gas streams around any of said conduits, said hexagonal head portions being supported by said casing which encloses the space around all of said conduits, said gas stream outer portions discharging into the space enclosed by said casing, said casing having a bottom wall which has a slanting portion and a vertical portion terminating in an opening running transverse to said conduits and positioned below the outlet ends of said first-named conduits, said slanting wall portion extending from the edge of said casing adjacent the outlet ends of said second conduits thereby to direct said gas stream outer portions toward said casing wall opening, said casing wall opening being alined with and opening into a throat portion of a tapered trough-shaped conduit, said trough-shaped conduit being operable to conduct away said particle laden gas stream outer portions, and inverted curved dividing members spaced at predetermined intervals in said conduit throat portion and operable to control the distribution of said gas stream outer portions entering said trough-shaped conduit thereby to effect a substantially equal collection of particles from each of said first-named conduits.

8. In a separator for removing foreign particles from a gas stream, a casing having a vertical wall, a plurality of horizontally disposed conduits in said casing and having their inlet ends opening through said wall, means to separate foreign particles from gas streams supplied to said conduits, said casing having a bottom wall opening extending transverse to said conduits for discharge of the foreign particles from said casing, a trough closing said bottom wall opening and having an outlet, and means subdividing said bottom wall opening into a plurality of spaced ports, said ports being of successively increasing flow area away from said trough outlet.

9. In a separator for removing foreign particles from a gas stream, a casing having a vertical wall, a plurality of horizontally disposed conduits in said casing and having their inlet ends opening through said wall, means to separate foreign particles from gas streams supplied to said conduits, said casing having a bottom wall opening extending transverse to said conduits for discharge of the foreign particles from said casing, a trough closing said bottom wall opening and having an outlet, and means subdividing said bottom wall opening into a plurality of spaced ducts, said ducts being of successively increasing flow area away from said trough outlet, said ducts being directed toward said trough outlet.

10. Flow equalizing means comprising a horizontal trough having an end outlet and with an inclined bottom wall sloping downward to said outlet, said trough having a top wall opening extending longitudinally thereof, means separating said opening into a plurality of spaced ports, said ports being of successively increasing flow area away from said trough outlet.

11. Flow equalizing means comprising a horizontal trough having an end outlet and with an inclined bottom wall sloping downward to said outlet, said trough having a top wall opening extending longitudinally thereof, means subdividing said wall opening into a plurality of spaced ducts, said ducts being of successively increasing flow area away from said trough outlet, and said ducts being directed toward said trough outlet.

GILBERT C. POLK.

REFERENCES CITED

The following references are of record in the file of this patent:

UNITED STATES PATENTS

| Number | Name | Date |
|---|---|---|
| 893,968 | Allington | July 21, 1908 |
| 1,717,639 | Waters | June 18, 1929 |
| 1,846,719 | Gross | Feb. 23, 1932 |
| 2,188,206 | Pfeffer et al. | Jan. 23, 1940 |